United States Patent [19]

Bruener et al.

[11] Patent Number: 5,606,851
[45] Date of Patent: Mar. 4, 1997

[54] BATTERY-POWERED LAWN CUTTING SYSTEM

[75] Inventors: Patrick J. Bruener, Hartland; Paul A. Tharman, Pewaukee; John A. Fiorenza, II, Slinger; Joseph L. Pfaff, Brookfield; Richard A. Dykstra, Cedar Grove; William H. Reitman, Fox Point, all of Wis.

[73] Assignee: Briggs & Stratton Corporation, Wauwatosa, Wis.

[21] Appl. No.: 543,054

[22] Filed: Oct. 13, 1995

Related U.S. Application Data

[63] Continuation of Ser. No. 388,588, Feb. 14, 1995, abandoned, which is a continuation-in-part of Ser. No. 125,486, Sep. 22, 1993, abandoned.

[51] Int. Cl.$^6$ .......................... A01D 34/67; A01D 34/78; A01D 34/82
[52] U.S. Cl. .......................... 56/11.9; 56/10.8; 56/17.2; 56/255; 56/DIG. 18
[58] Field of Search .......................... 56/11.9, 10.8, 56/17.1, 17.2, 16.7, 17.5, 255, 295, DIG. 17, DIG. 20, DIG. 18; 16/110, 111

[56] References Cited

U.S. PATENT DOCUMENTS

| | | | |
|---|---|---|---|
| D. 311,897 | 11/1990 | Moore et al. | D13/107 |
| D. 316,397 | 4/1991 | Herbert | D13/106 |
| D. 327,248 | 6/1992 | Hotsumi et al. | D13/108 |
| 2,159,042 | 5/1939 | Odell | 136/171 |
| 2,702,448 | 2/1955 | Smith | 56/25.4 |
| 2,727,753 | 12/1955 | Johnson et al. | |

(List continued on next page.)

FOREIGN PATENT DOCUMENTS

| | | |
|---|---|---|
| 64006/73 | 12/1972 | Australia . |
| 6400673 | 7/1975 | Australia . |
| 28344/77 | 11/1980 | Australia . |
| 2252802 | 8/1975 | France . |
| 2636498 | 3/1990 | France . |
| 2545629 | 4/1977 | Germany . |
| 2604609 | 8/1977 | Germany . |
| 9313032 | 1/1994 | Germany . |
| 1349813 | 4/1974 | United Kingdom . |

OTHER PUBLICATIONS

Sigma S. P. A. brochure entitled "Milady 35 Accumulator" published Mar., 1993.
Ryobi Outdoor Products, Inc., "Owners Operating Manual Cordless Mulching Mower Model BMM2400", published Jan., 1993.
AL–KO Kober brochure entitled "AL–KO Accu Tech 32", published Aug., 1993.
"Electric Mower that really works", Popular Science, Mar. 1974, p. 28 etc.
"Lawn–Boy—19" Cordless Electric Mower model 5801" pp. 1–20, published by OMC–Lincoln, Lincoln, NE 68501, a Div. of Outboard Marine Corp., 1974.

(List continued on next page.)

*Primary Examiner*—Terry Lee Melius
*Attorney, Agent, or Firm*—Michael, Best & Friedrich

[57] ABSTRACT

The improved battery-powered lawnmower includes a safety key that is automatically removed when the removable battery is removed, while at the same time blocking the battery recharger receptacle. The lawnmower also includes a control circuit that shuts off the lawnmower upon the occurrence of one or more of several predetermined conditions, including low battery voltage, the encountering of heavy grass for a period of 3 seconds or more, and high motor current that may occur when the cutting blade is jammed. The cutting blade is designed to move through any debris accumulated between the blade ends and the housing sidewall without sacrificing the lift for needed cutting and mulching. The invention also includes a unique height adjustment assembly for adjusting the height of the chassis, a handle attachment that allows the handle to be positively tightened to the lawnmower chassis, and a telescoping groove for the battery's quick connect/disconnect terminals.

38 Claims, 10 Drawing Sheets

U.S. PATENT DOCUMENTS

| | | | |
|---|---|---|---|
| 2,909,885 | 10/1959 | Smith | 56/25.4 |
| 3,212,244 | 10/1965 | Wilgus | 56/25.4 |
| 3,357,715 | 12/1967 | Plamper et al. . | |
| 3,357,716 | 12/1967 | Musichuk . | |
| 3,423,103 | 1/1969 | Maltarp . | |
| 3,462,924 | 8/1969 | Price et al. . | |
| 3,485,017 | 12/1969 | Duran et al. . | |
| 3,512,344 | 5/1970 | Kortum . | |
| 3,534,432 | 10/1970 | Dvies, III et al. . | |
| 3,581,480 | 6/1971 | O'Connor, III et al. | 56/11.9 |
| 3,604,187 | 9/1971 | Weber . | |
| 3,649,997 | 3/1972 | Thorud . | |
| 3,676,989 | 7/1972 | Slayton | 56/10.5 |
| 3,694,855 | 10/1972 | Meyer et al. . | |
| 3,757,194 | 9/1973 | Weber et al. | 320/2 |
| 3,816,873 | 6/1974 | Thorud et al. . | |
| 3,854,834 | 12/1974 | Lane | 403/386 |
| 3,855,763 | 12/1974 | Seifert et al. . | |
| 3,871,924 | 3/1975 | DeMattie et al. | 136/166 |
| 3,950,817 | 4/1976 | McKaig | 16/111 |
| 3,971,176 | 7/1976 | Stevenson . | |
| 3,973,378 | 8/1976 | Bartasevich et al. | 56/11.9 |
| 3,989,544 | 11/1976 | Santo | 429/65 |
| 4,031,696 | 6/1977 | Fleigle | 56/295 |
| 4,044,532 | 8/1977 | Lessig, III | 56/10.5 |
| 4,132,280 | 1/1979 | Jones et al. . | |
| 4,167,093 | 9/1979 | Pfeiffer et al. | 56/17.2 |
| 4,291,522 | 9/1981 | Kawasaki et al. . | |
| 4,300,087 | 11/1981 | Meisner | 320/2 |
| 4,435,486 | 3/1984 | Pomaro et al. | 429/1 |
| 4,446,680 | 5/1984 | D'Alessandro | 56/11.9 |
| 4,577,455 | 3/1986 | Amano et al. . | |
| 4,756,978 | 7/1988 | Nitcher et al. | 429/1 |
| 4,835,952 | 7/1989 | McLane . | |
| 4,876,490 | 10/1989 | Kolb | 318/17 |
| 4,882,896 | 11/1989 | Wilcox | 56/10.5 |
| 4,942,723 | 7/1990 | Wassell | 56/10.6 |
| 4,983,903 | 1/1991 | Bae et al. | 320/2 |
| 5,039,929 | 8/1991 | Veistroffer et al. | 320/2 |
| 5,085,043 | 2/1992 | Hess et al. | 56/10.5 |
| 5,163,275 | 11/1992 | Hare et al. | 56/DIG. 18 X |
| 5,197,267 | 3/1993 | Aldred et al. | 56/249 |
| 5,199,251 | 4/1993 | Rouse et al. | 56/255 |
| 5,203,147 | 4/1993 | Long | 56/10.1 |
| 5,230,208 | 7/1993 | Hess et al. | 56/17.2 |
| 5,251,429 | 10/1993 | Minato et al. | 56/17.2 |
| 5,261,215 | 11/1993 | Hartz et al. . | |
| 5,327,710 | 7/1994 | Plamper et al. | 56/255 |
| 5,402,626 | 4/1995 | Zinck | 56/11.9 |
| 5,490,370 | 2/1996 | McNair et al. | 56/11.9 |

OTHER PUBLICATIONS

"AS 32 Accutronic Batterymower", published by AS Motor, p. 11. (Date Unknown).

Snapper Power Equipment "Safety Instructions & Operator's Manual for Snapper Light Weight Hi–Vac—Series 7", p. 6, published Sep. 1990.

Black & Decker, "Instruction Manual CMM650 18" Cordless Mulching Mower", pp. 3, 6, published Dec. 1993.

Sears Owners Manual, Model No. 900.370240, 18" Electric Lawnmower with Flip Handle, published Dec., 1990.

Macauto Industrial Co., Ltd., Eco–Star Cordless Electric "2–IN–1" Lawn Mower, published 1993.

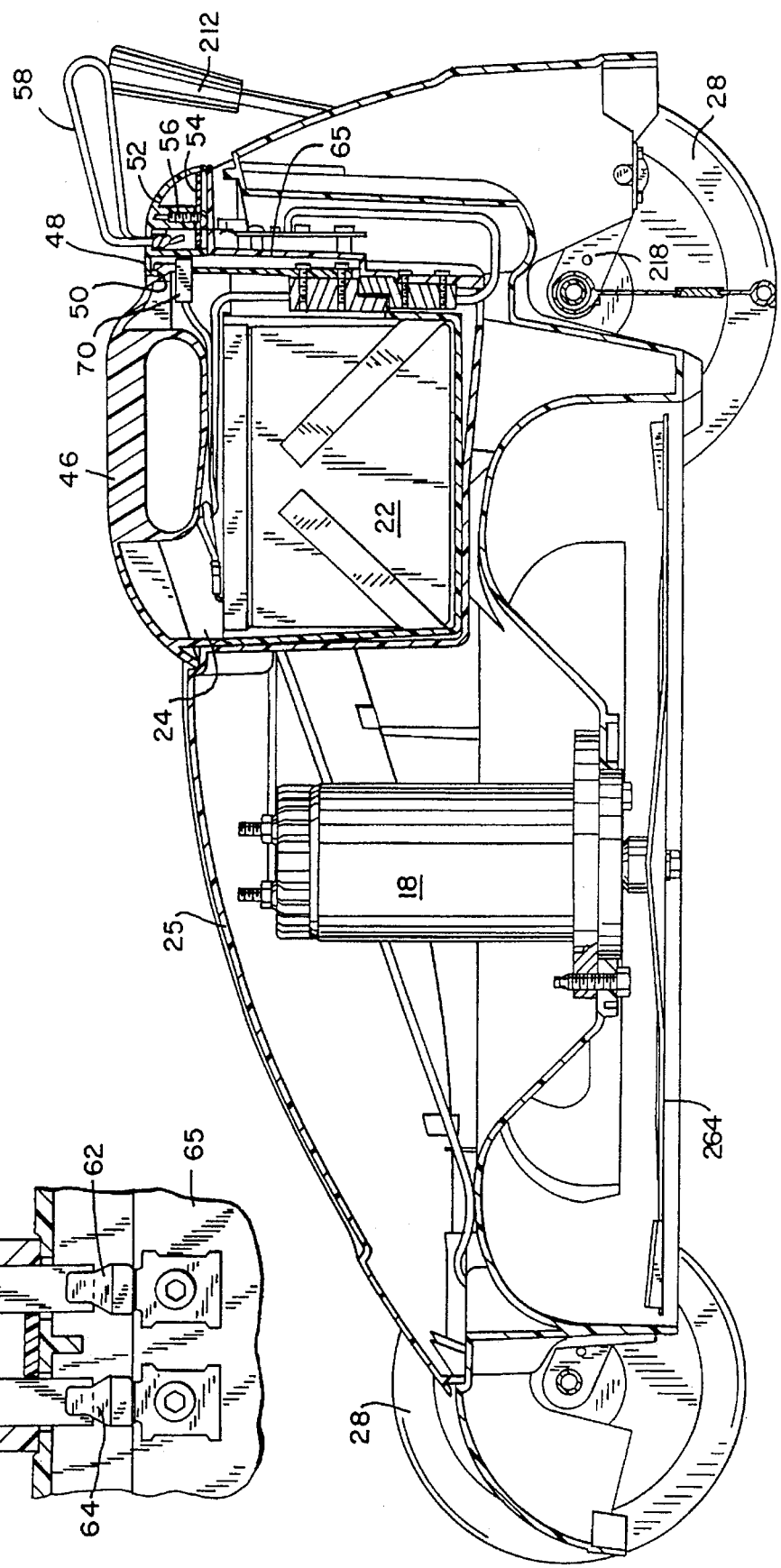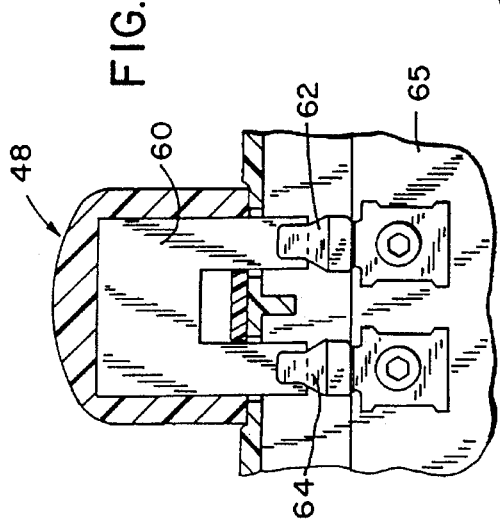

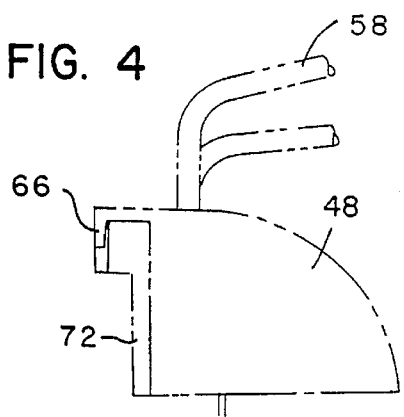
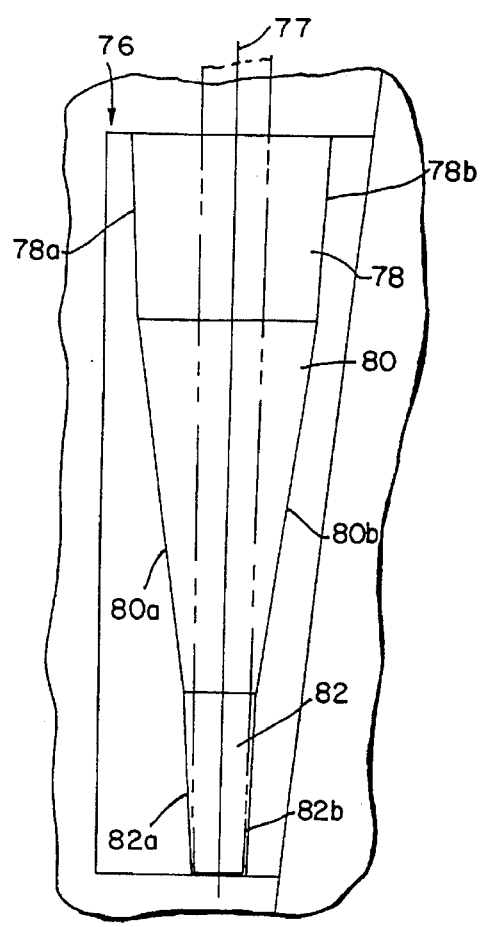
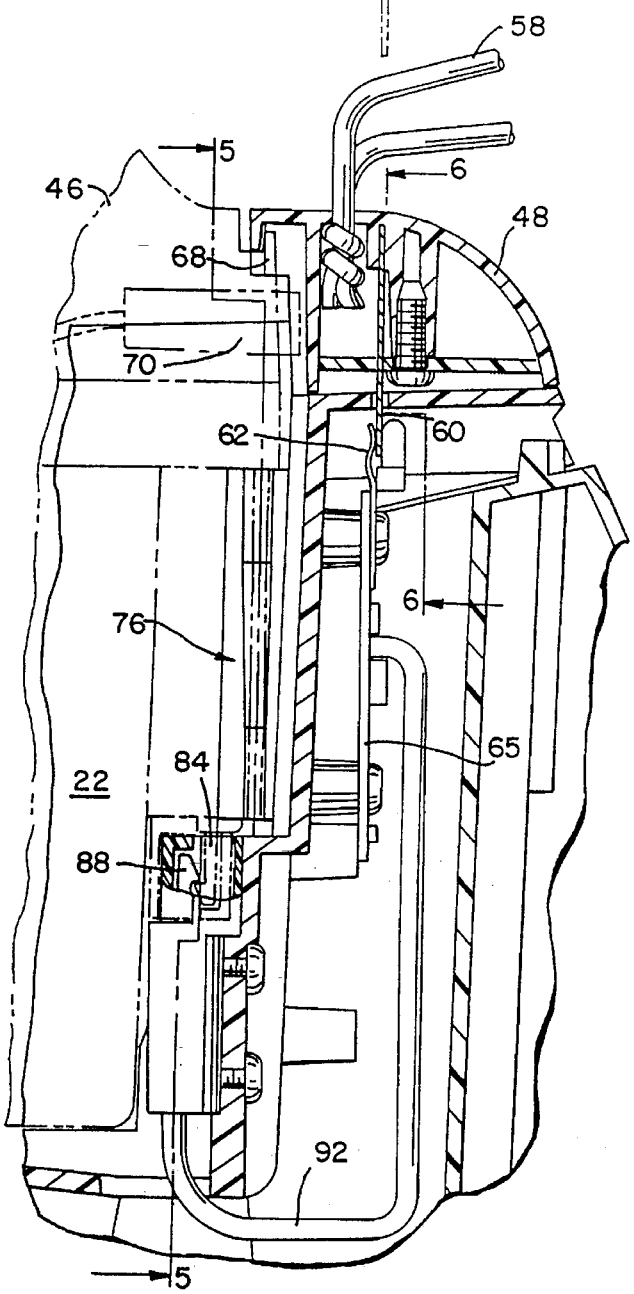

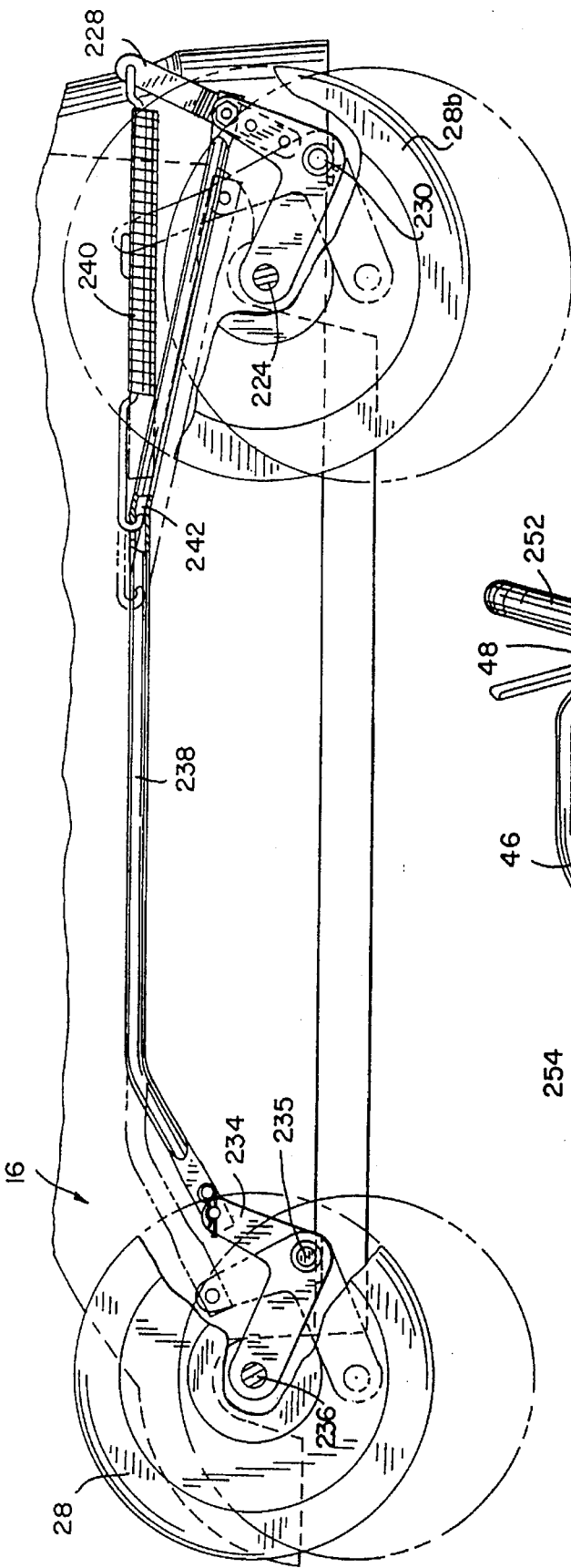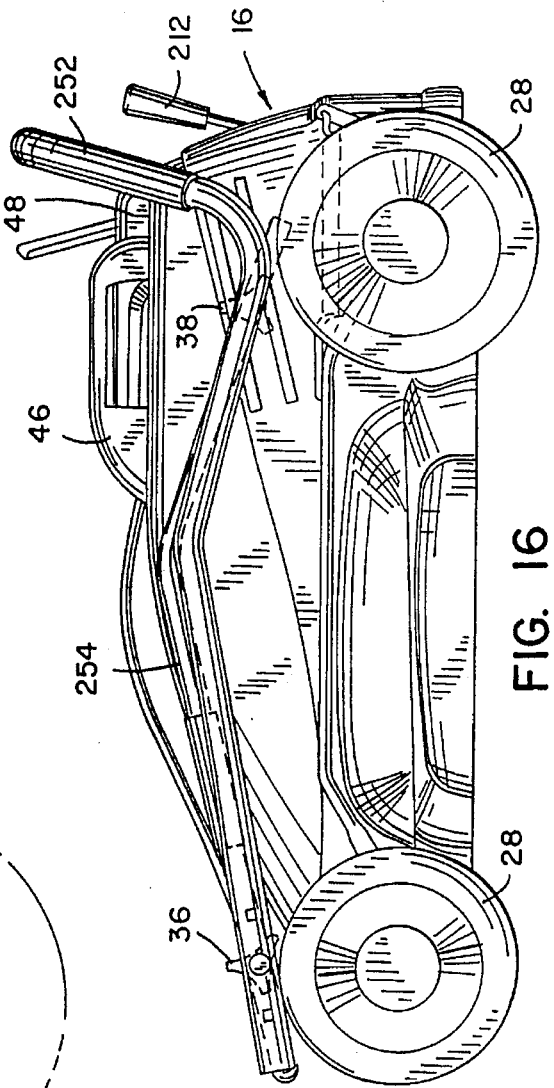

ns of the same
BATTERY-POWERED LAWN CUTTING SYSTEM

BACKGROUND OF THE INVENTION

This application is a continuation of Ser. No. 08/388,588, filed Feb. 14, 1995, (now abandoned), which is a continuation-in-part application of U.S. Ser. No. 08/125,486, filed Sep. 22, 1993, to Feldner, et al, now abandoned.

This invention relates to electric lawnmowers. More particularly, this invention relates to battery-powered lawnmowers having removable, rechargeable batteries and a rotating cutting blade.

Electric lawnmowers are known which operate on AC line current. These lawnmowers typically have a plug attached to the handle that is suitable for connection with an AC power cord. A primary disadvantage of such prior art lawnmowers is that the cord is unwieldy and cumbersome, requiring the operator to constantly manipulate or move the cord to keep it out of the way of the cutting blade. Also, the cord may be cut by the rotating cutting blade, leading to a short circuit.

To avoid the problems of such so-called "cord electric" lawnmowers as described above, cordless battery-electric lawnmowers have been developed. Such lawnmowers typically have one or more large rechargeable batteries disposed on the mower chassis along with the electric motor. The batteries are typically recharged by connecting a battery recharger to the lawnmower, or by an on-board charger connected to a conventional household outlet via an extension cord.

A major disadvantage of such prior art "cordless electric" lawnmowers is that they are difficult to maneuver and push due to he weight of the batteries. The batteries must typically be very large for the lawnmower to run a sufficient length of time to mow the average size lawn. In a typical prior art battery-electric lawnmower, the batteries will operate the lawnmower from 30 to 90 minutes before the batteries have to be recharged. For a lawnmower having batteries that operate for 30 to 90 minutes before recharging, the lawnmower generally weighs about 55 to 80 pounds. Such lawnmowers are difficult to maneuver and to push uphill. Such lawnmowers may be impossible to use by weaker people.

Although it is possible to reduce the weight of the lawnmower by reducing the size of the batteries, such weight reduction also reduces the length of lawnmower operating time between recharges. As a practical matter, a prior art lawnmower which operates for less than 25 minutes between recharges would be of limited utility since many lawns require more than 25 minutes to cut.

The electrical and power components of a battery-powered lawnmower of prior art devices may be damaged under certain circumstances. For example, if the battery is frequently allowed to discharge too much, irreparable damage may result to the battery. Also, high current conditions may occur during the operation of the lawnmower which may damage the electrical components.

Another problem with prior art lawnmowers is that grass clippings may accumulate between the inner sidewall of the lawnmower chassis and the rotating cutting blade. This accumulation may result in jamming of the lawnmower. One prior art technique for reducing the likelihood of such jamming was to form the outer edge of the cutting blade at an angle, so that the leading edge of the cutting blade ends in a point that presumably moves through any accumulated grass clippings on the inner sidewall of the mower housing.

This solution is unsatisfactory, however, because it reduces the amount of lift at the end of the cutting blade, where it is most needed to achieve a proper cut and for proper mulching. The so-called "lift" is created by a lift section on the cutting blade behind the lead cutting edge of the blade. However, when the outer edge of the blade is tapered, the surface area of the lift section at the end of the blade is substantially reduced, thereby reducing the lift created by the rotating cutting blade. Also, the tapering of the outer edge of the blade allows grass clippings to escape more readily through the clearance between the lawnmower chassis and the cutting path of the blade, which is undesirable for mulching.

SUMMARY OF THE INVENTION

A vegetation cutting system is disclosed that uses a lawnmower having an electric motor, at least one removable, rechargeable battery pack adapted to being connected in circuit with the electric motor, a chassis or housing for supporting the electric motor, a plurality of wheels interconnected with the chassis to allow the mower to be moved, a handle interconnected with the chassis, and a rotary cutting means, such as a cutting blade, interconnected with a rotatable motor shaft of the motor. The vegetation cutting system also includes a means for recharging the battery, which may be disposed on the cutting apparatus or provided as a separate unit.

The cutting system may also include a circuit that shuts off the lawnmower if the battery voltage falls below a preset level, if the lawnmower current exceeds a second preset level when the cutting blade encounters excessive load, such as too heavy grass, or if the lawnmower current exceeds a third preset level such as when the cutting blade becomes jammed to the extent that it cannot rotate. In any case, the lawnmower may be restarted by disengaging and then re-engaging the deadman handle, The cutting system may also include a second battery and a wire harness which allows the single charger output to charge both batteries simultaneously. Each battery pack may include a diode to prevent one charged battery pack from dumping its charge into the other battery pack when both battery packs are being charged simultaneously by the recharger. The diode in each battery pack also has a second function; it prevents a spark or fire if someone accidentally shorts the two exposed charging terminals that are in the battery pack charging connector. The short may otherwise occur when a screwdriver or other conducting object is accidentally placed in contact with both pins of the same charging connector.

In one embodiment, the cutting apparatus includes a retaining means, such as a battery receptacle that is integral with the chassis, having an attachment means to which the battery pack is attached, or having an opening therein into which the battery pack is placed. Both the battery pack and the retaining means have mating quick connect/disconnect terminals to allow the battery pack to be quickly attached or inserted into the receptacle opening, and quickly removed and replaced. A unique, multipart telescoping groove is provided to readily guide the battery terminals into engagement with the mating quick connect/disconnect terminals. The battery pack has a handle, preferably connected to its upper portion, so that the battery pack may be readily lifted out of, or otherwise detached from, the retaining means.

A battery recharging means may be connected to the battery pack via a plug in the battery pack, or the battery pack may be lifted from the lawnmower and either connected to a recharging means or placed in a receptacle opening within a battery recharging means. A removable safety key is provided that blocks the recharging plug on the battery pack during lawnmower operation to prevent the lawnmower from being operated while the installed battery pack is being recharged. The installed safety key also prevents the battery pack from being replaced without first removing the key.

The battery recharging means may include one or more receptacle openings, each of the openings being adapted to receive a battery pack. An alarm circuit may be provided on the battery that emits an alarm signal when the voltage of the battery falls below a predetermined level. A second alarm system may be included which would provide an audible or visual signal when the key is still in place.

The present invention also comprises a method of cutting grass with a battery-powered lawnmower. According to the method of the present invention, the cutting apparatus is operated using a first removable, rechargeable battery or battery pack until the first battery is discharged to a selected level. The first battery is then electrically disconnected from the electric motor of the cutting apparatus and removed, and the cutting apparatus continues to operate to cut the grass using a second battery as a power source. The first battery may remain in place for recharging, or it may be removed and placed into or connected to a separate recharging unit. In a preferred embodiment, the first battery is removed and replaced by a second battery which has been fully charged by the battery recharger.

Once the second battery has been discharged to a selected level, it is electrically disconnected from the electric motor. The second battery is preferably disconnected by removing it and replacing it with either the recharged first battery or with a third battery, which is then electrically connected to the electric motor. The discharged second battery is then electrically connected with he recharger by either attaching the discharged second battery to the recharger or by placing the discharged second battery within an opening in the recharger housing. The operation of the cutting apparatus is then continued, using either the recharged first battery or the third battery.

If the method described above is used with at least two batteries, the cutting apparatus may be substantially continuously operated for an extended period of time to cut almost any size lawn. At the same time, the weight and size of he cutting apparatus are reduced since the cutting apparatus only carries with it a single battery at a time. When the cutting system is used with two such batteries, the cutting apparatus may be continuously operated for twice as long, even without recharging.

In one embodiment, the recharger is a so-called "quick charge" recharger that recharges a battery to 80% of its maximum level within a short period of time. With this type of recharger, almost all lawns may be cut using two or three batteries—only one of which need be disposed on the cutting apparatus at any given time. A second battery could optionally be carried on the cutting apparatus to be used when the first battery becomes discharged.

The invention also has several other important features, including a cutting blade that lessens the likelihood of jamming while sill lifting the grass for cutting, a unique height adjustment assembly, and a handle attachment that enables the handle to be tightened down as well as loosened for lawnmower storage.

Another feature of the invention is that a mulcher or side-discharge mower can be achieved with a simple attachment change. The mulcher plug and side discharge chute each contain an attached magnet. When either attachment is in place on the chassis, the magnet closes a reed switch located within the chassis enclosure, allowing mower operation. If neither attachment is in place, the mower cannot be operated. This safety feature protects an operator or bystander by preventing operation when the operator's hand could be in the blade area, and protects the operator or bystanders from thrown objects.

It is a feature and advantage of the present invention to provide a battery-powered lawn cutting system that may be operated for an extended period of time to cut virtually any size of lawn.

It is yet another feature and advantage of the present invention to provide a battery-electric cutting apparatus that is relatively lightweight and easy to maneuver when compared to prior art devices.

It is yet another feature and advantage of the present invention to provide a battery-electric lawn cutting system that is adaptable to being used with small lawns or with large lawns simply by increasing the number of removable, rechargeable batteries in the system.

It is yet another feature and advantage of the present invention to provide a battery-electric cutting apparatus in which an unusable battery may be easily replaced by a non-skilled person.

These and other features and advantages of the present invention will be apparent to those skilled in the art with the following detailed description of the preferred embodiments and the drawings, in which:

BRIEF DESCRIPTION OF THE DRAWINGS

FIG. 3 is a cross-sectional side view of a lawnmower according to the present invention.

FIG. 4 is an exploded side cross-sectional view depicting a safety key being removed.

FIG. 6 is an end cross-sectional view of the key-connector assembly according to the present invention.

FIG. 7 is a diagrammatical view of the telescoping groove that receives the battery's quick disconnect terminals.

FIG. 12 is an exploded side view depicting the height adjustment assembly.

FIG. 16 is a side view of the lawnmower, depicting the folded handle.

FIG. 17 is a cross-section end view depicting the handle attachment assembly.

DESCRIPTION OF THE PREFERRED EMBODIMENT

Figure 1:
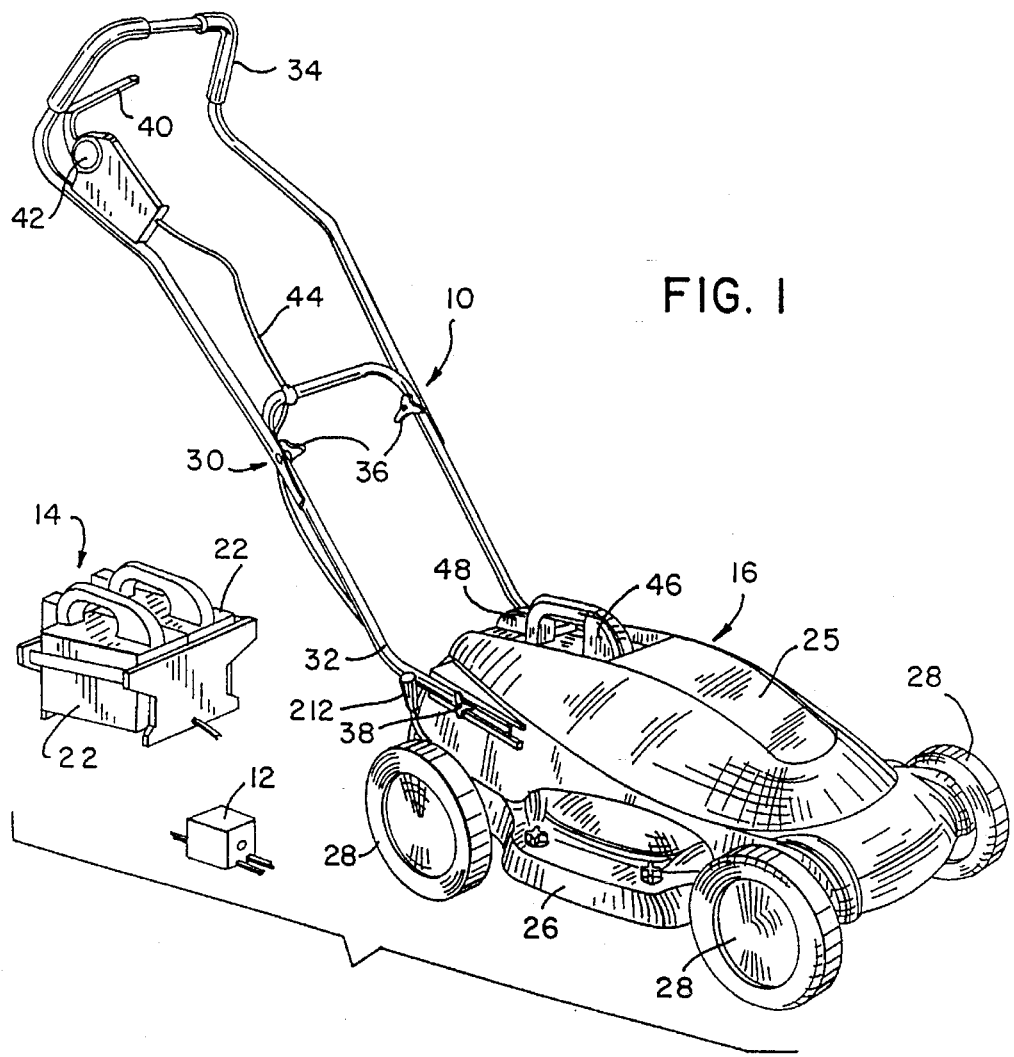
FIG. 1 is a perspective view of the vegetation cutting system according to the present invention.

FIG. 1 is a perspective view depicting the major components of he vegetation cutting system according to the present invention. The system depicted in FIG. 1 preferably includes a battery-powered lawnmower 10 and either a trickle battery recharger 12 or a stand-alone battery recharger 14.

Figure 8:
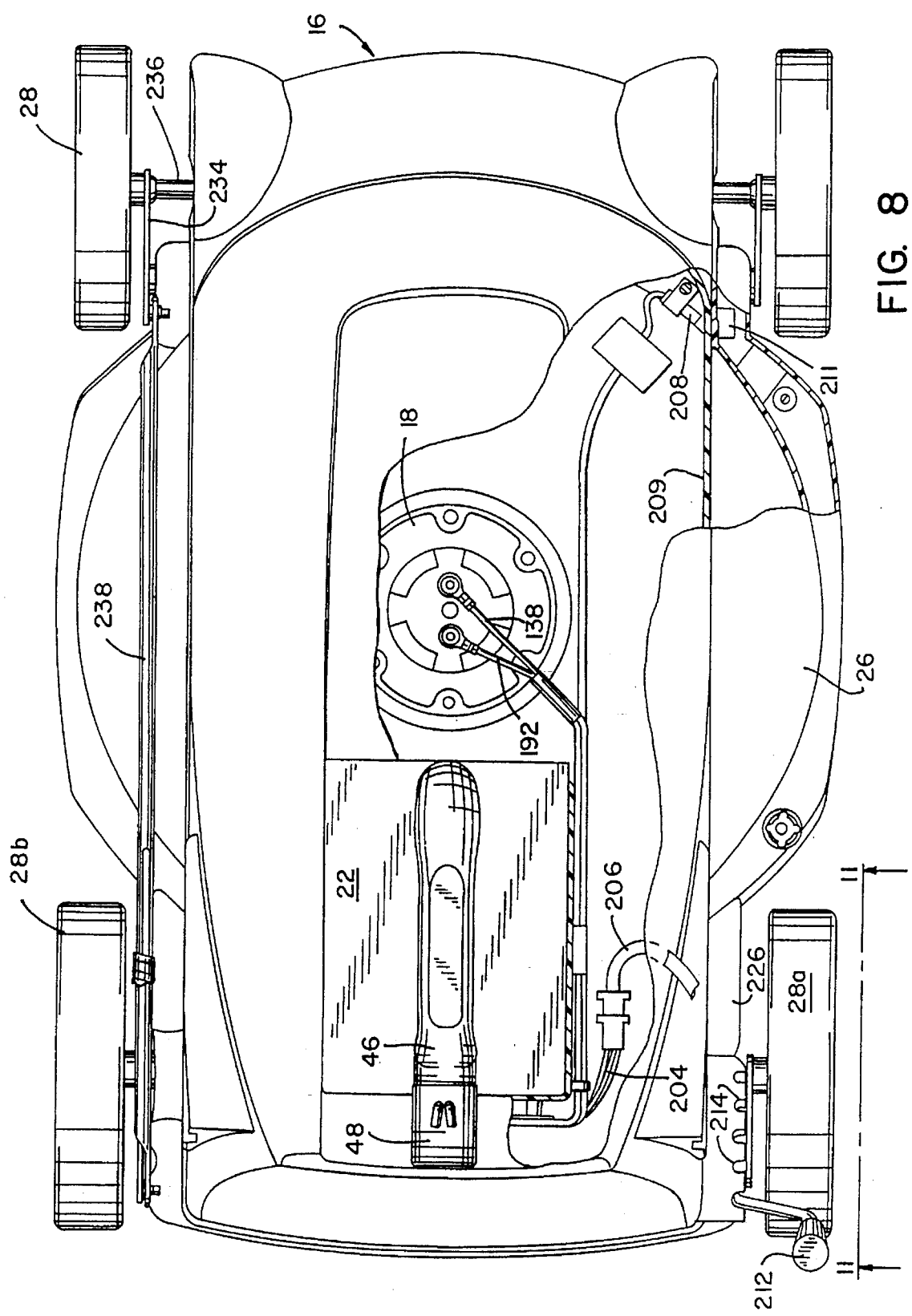
FIG. 8 is a top view of the lawnmower chassis, shown in partial section.
Figure 18:
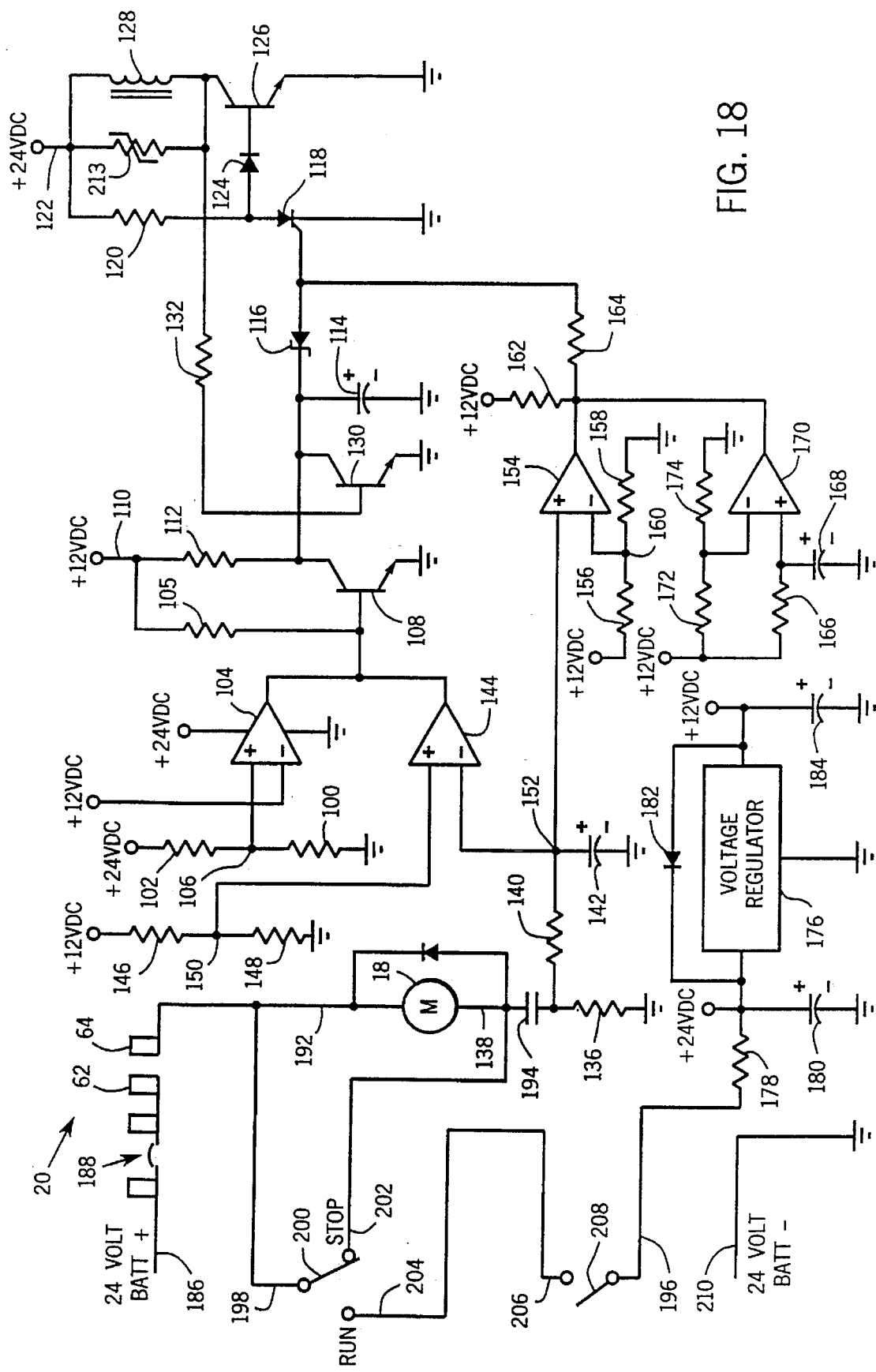
FIG. 18 is a schematic diagram of a control circuit according to the present invention.

Lawnmower 10 includes a lawnmower chassis 16 that provides support to a power unit consisting of an electric motor 18 (FIG. 3), a control circuit 20 (FIG. 18), a removable rechargeable battery pack 22 (FIG. 3) and an integrally-formed receptacle 24 (FIG. 3) which retains battery pack 22 in a substantially fixed position. Battery pack 22 comprises two 12 volt batteries connected in series. Of course, a single battery could be used; the terms "battery" and "battery pack" are used interchangeably herein. Receptacle 24 is integrally formed with lawnmower shroud 25. Motor 18 is connected to control circuit 20 by a pair of wires 138 and 192 (FIGS. 8 and 18).

Although it may be desirable to retain battery 22 in place by providing receptacle 24 with an opening for receiving battery pack 22, other means could be used to retain battery pack 22 in a fixed position. For example, the battery retaining means could comprise a frame that, along with the quick connect/disconnect electrical terminals discussed herein, acts as a retainer member to hold the battery in place. In the alternative, the battery retaining means could include one or more mechanical connectors that keep the battery in a substantially fixed position. The retaining means could also consist of the electrical terminals alone.

Referring again to FIG. 1, lawnmower 10 may include a mulching attachment 26 which prevents the discharge of cut grass. Of course, the mulching attachment may be replaced by a chute to allow side discharge of the cut grass, or by a bagging attachment. Chassis 16 is supported by four rotatable wheels 28, which allow the lawnmower to be moved from one place to another.

The movement of the lawnmower is controlled by the operator using a handle assembly 30. Handle assembly 30 has a first end 32 that is interconnected with chassis 16, and an opposed second end 34 disposed away from the chassis. Handle assembly 30 may be folded by loosening a pair of thumbscrews 36, and by loosening a second pair of thumbscrews 38 affixed to chassis 16.

Interconnected with handle assembly 30 is an elongated bail handle 40 that is moved and gripped by the operator during operation of the lawnmower. Bail handle 40 may be replaced by one or more pushbuttons. Interconnected with elongated handle 40 is a push button switch 42, with handle 40 and switch 42 together comprising the so-called "deadman" switch. A wire 44 is interconnected with handle 40, and enables the lawnmower to be stopped when bail handle 40 is released.

Figure 2:
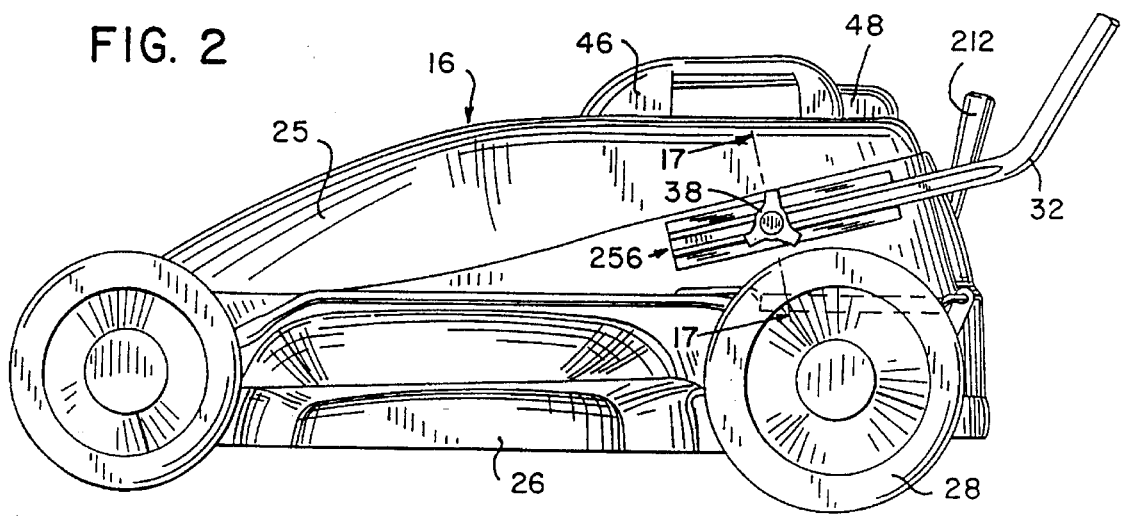
FIG. 2 is a side view of a lawnmower according to the present invention.

As best shown in FIGS. 1 through 3, removable battery 22 has a handle 46 attached to its upper end. Handle 46 is positioned or biased toward the quick connect/disconnect terminals to allow the battery to be readily inserted and removed from chassis 16 without binding. As more fully discussed below, a safety key 48 engages a surface 50 (FIG. 3) on battery 22 such that the removal of battery 46 also results in the removal of safety key 48.

Safety key 48 and its uses are best understood in connection with FIGS. 3, 4 and 6. In FIGS. 3, 4 and 6, safety key 48 has an outer housing 52, a lower member 54, and a bolt 56 that connects housing 52 and lower member 54. Safety key 48 also includes a flexible handle or rope 58 that may be pulled by the operator to remove the key from the control circuit, or used to hang the key for storage.

As best shown in FIG. 6, safety key 48 includes a conductive element 60 that completes an electrical circuit between a pair of terminals 62 and 64 disposed on lawnmower chassis 16. Terminals 62 and 64 are connected to a circuit board 65 that contains control circuit 20 (FIG. 18). When safety key 48 is removed, the circuit is broken and no power flows to motor 18.

As best shown in FIGS. 3 and 4, safety key 48 also includes a protruding, engagement member or flange 66 that engages a surface 50 on battery pack 22. In fact, battery pack 22 may be provided with a ridge or flange 68 to retain key flange 66 in place. When battery 22 is being removed, the upward motion of surface 50 causes flange 66 disposed thereon to also move in an upward direction, thereby displacing key 48. When the key has been removed, the lawnmower will not operate. In the alternative, battery pack 22 may be provided with the engagement member, which engages the key to displace the key when the battery is removed.

Another purpose of key 48 is to block battery pack recharger plug 70 (FIG. 3), into which a battery recharger may otherwise be connected. Recharger plug 70 may be disposed on the battery, or it may be disposed on shroud 25 or chassis 16. Key 48 has a surface 72 which blocks recharger plug 70. It is desirable to block recharger plug 70 when the lawnmower is being operated to prevent the lawnmower from being operated while the battery pack is being recharged. However, once key 48 is removed, a charger may be plugged into receptacle 70 while the battery pack is still in place. Key flange 66 extends a sufficient distance over battery receptacle 24 to prevent battery pack 46 from being inserted while key 48 is in place.

Figure 9:
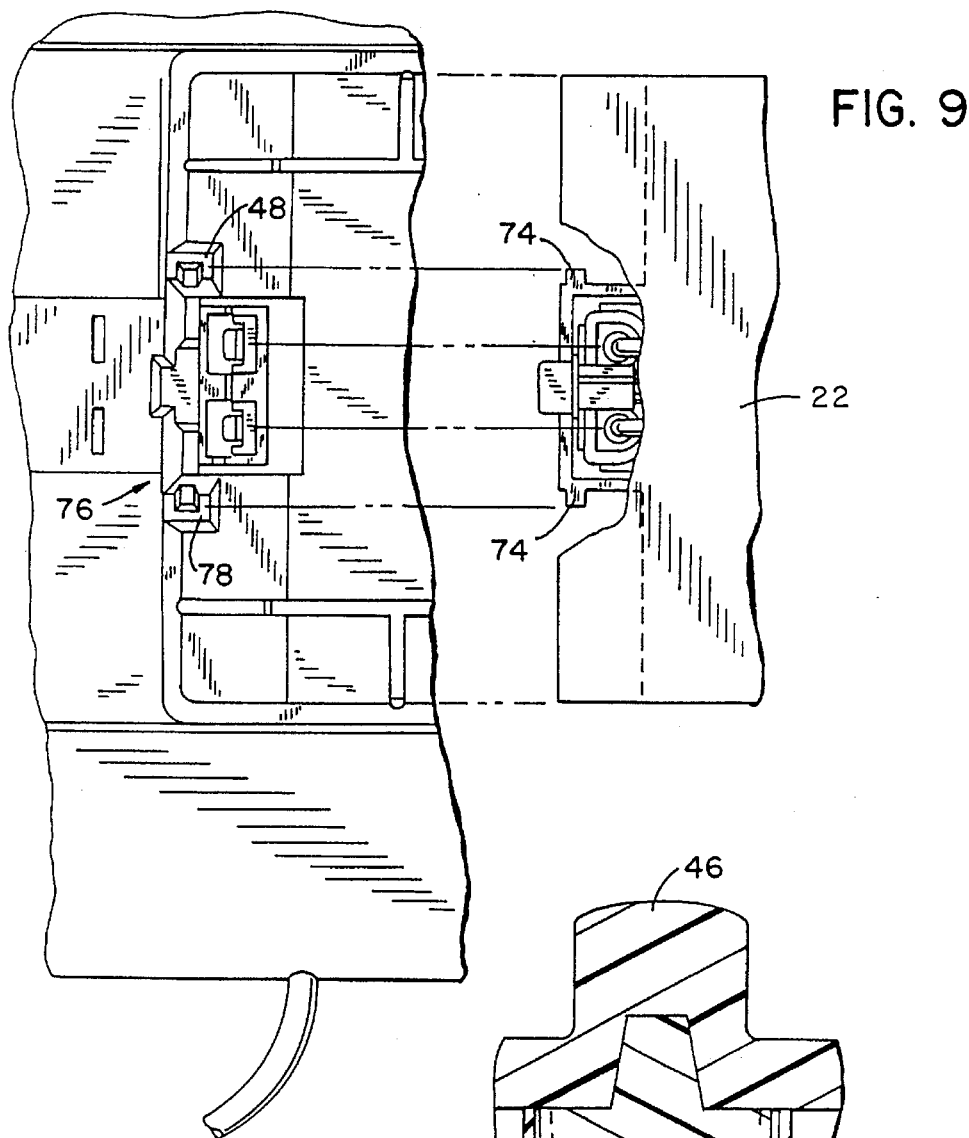
FIG. 9 is an exploded top view depicting the battery being slid into the battery receptacle.

Another important feature of the present invention comprises the manner in which the battery is readily placed and removed from the battery receptacle, as well as the quick connect/disconnect terminals used to connect the removable battery pack to the lawnmower electrical system. These features are best understood in connection with FIGS. 3 through 5, 7 and 9. As best shown in FIGS. 4, 7, and 9, the battery is mounted to the lawnmower chassis by providing one or more projections 74 on battery 22, which are received in a groove 76 provided in lawnmower chassis 16. A top view of groove 76 is shown in FIG. 9. As best shown in FIGS. 4 and 7, groove 76 preferably includes three tapered sections 78, 80, and 82. First tapered section 78 has a first set of three tapered sidewalls 78a, 78b and 78c, each of sidewalls 78a, 78b and 78c forming a first angle with longitudinal axis 77 of groove 76 that is between 0° to 5°, with one-half degree being preferred. Also, second tapered section 80 has three tapered sidewalls 80a, 80b and 80c, each of which forms a second angle with respect to longitudinal axis 77 of groove 76 of between 1° to 45°, with 2° being preferred. Similarly, third tapered section 82 has a third set of sidewalls 82a, 82b and 82c, each of which forms a third angle with respect to longitudinal axis 77 of between 0° to 5°, with one-half degree being preferred.

The purpose of tapered groove 76 and tapered sections 78 through 82 is to facilitate the placement and removal of battery 22. The multipart tapered groove has a tendency to guide battery projections 74 into groove 76, thereby facilitating the electrical connection between the battery connectors and the chassis connectors. The sidewalls of second tapered section 80 form a larger angle to the longitudinal axis than the other tapered sidewalls to increase the size of the upper end of groove 76 to facilitate battery placement.

Figure 5:
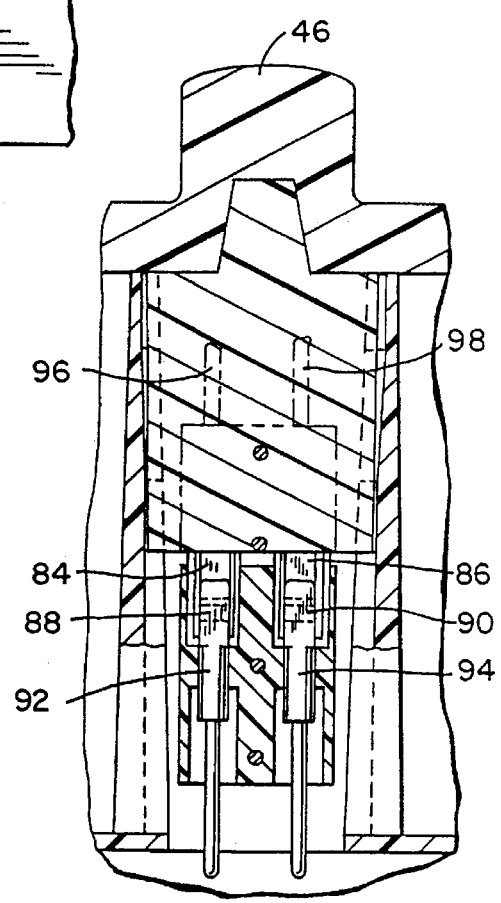
FIG. 5 is a cross-sectional end view of the battery slide mount, taken along line 5—5 of FIG. 4.

These electrical connectors are best shown in FIGS. 4 and 5. In FIGS. 4 and 5, battery pack 22 has a pair of electrical connectors 84 and 86 which engage connectors 88 and 90, respectively, on the lawnmower chassis. Each of electrical connectors 84 through 90 may be a resilient or spring type of connector, and may have a protruding ridge that engages a mating protruding ridge on the opposed connector.

Chassis connectors 88 and 90 are connected to control circuit 20 by cables 92 and 94, respectively. Similarly, battery connectors 84 and 86 are connected to battery pack 22 by cables 96 and 98, respectively.

The lawn cutting system according to the present invention may be used to cut virtually any size of lawn, if two or more removable batteries are used. The number and/or size of the batteries that are included in the system are dictated by cost factors and by the length of time the operator wants to run the lawnmower continuously. For example, the operator may have a small lawn and, thus, be able to cut the entire lawn in 20 to 30 minutes. In that case, the operator would only require a single battery, which will run the lawnmower from about 15 to 40 minutes.

At additional expense, the user may purchase a system, or upgrade a previously-purchased single battery system, to include two or more batteries. With such a system, the operator runs he lawnmower with a first battery until the first battery discharges to a predetermined level. The first battery is then placed in the battery recharger, as depicted in FIG. 1. A second, recharged battery, which may have been connected to the battery recharger, is then inserted into receptacle 24 of chassis 16 (FIG. 1) and the operation of the lawnmower is continued. When the second battery has discharged to a predetermined level, the second battery is electrically disconnected from motor 18 and is removed from the battery receptacle. The second battery is then electrically connected to recharger (FIG. 1). Thereafter, either the recharged first battery or a third battery is placed into the battery receptacle so that operation of the lawnmower is continued. It may be desirable to use a quick-charge recharger to enable the first battery to be recharged to approximately 80% of full charge within a short period of time.

Using the above-described system with two or more batteries enables the lawnmower to be substantially continuously operated for an extended period of time. Since statistics indicate that most lawns may be cut in 20 to 60 minutes, it is apparent that a cutting system that uses two or more batteries—each permitting 15 to 40 minutes of cutting—would enable the majority of lawns to be cut with substantially continuous operation. If three batteries are used in the system, a lawn of almost any size may be cut. At the same time, the weight and size of the lawnmower is reduced since it is necessary to carry only a single, relatively small battery on the lawnmower at one time.

The present invention also includes a unique control circuit that shuts down the electric lawnmower under several predetermined conditions In each case, however, the lawnmower may be restarted by releasing deadman handle 40 (FIG. 1), and thereafter moving deadman handle 40 again, after pushing button 42, so that handle 40 is gripped along with handle end 34 by the operator to restart the lawnmower.

The first predetermined condition which results in the shutdown of the lawnmower is that the battery pack output voltage has dropped to a predetermined level. Assuming that the battery output voltage is normally 24 volts, the predetermined low voltage level may be approximately 16 to 19 volts, with 18 volts being preferred. The purpose of this feature is to prevent deep discharging of the batteries, thereby avoiding harm to the batteries.

The second predetermined condition under which the lawnmower is shut down occurs when electric motor 18 is continuously drawing 32 to 38 amps of current, with 35 amps being preferred, for more than 3 seconds. This predetermined condition will typically occur if the operator is mowing through heavy or thick grass so that the load on the motor forces the motor current to go very high. The purpose of the 3 second delay feature is to prevent the motor from being turned off only when a temporary heavy load condition occurs, such as a small but thick clump of grass, or when the current surges upon starting the motor. This shutdown feature prevents the electrical components in the lawnmower from becoming too warm, and prevents the rapid discharge of the battery.

The third predetermined condition leading to shutdown is hat the motor is drawing 50 amps or more of current at any time after the motor is started. This feature is disabled during lawn mower start-up due to the normal, high in-rush current that occurs during start-up- Thereafter, however, current to the motor will be turned off when the motor current exceeds approximately 50 to 60 amps, with 50 amps being preferred. The motor current will exceed 50 amps if the cutting blade is stalled, such as when the blade is jammed with a stick or a cord FIG. 18 is a schematic diagram of the control circuit for shutting down the lawnmower when the above-discussed predetermined conditions occur. In FIG. 18, the low battery voltage shutdown circuit comprises resistor 100, resistor 102, and comparator 104. Resistor 105 is a pull-up resistor for comparators 104 and 144. Comparator 104 has two inputs; the negative input is set at 12 volts, and the positive input is divided down by the resistor network consisting of resistors 100 and 102. The voltage at node 106, between resistors 100 and 102, is two-thirds of the present battery voltage. Once the battery voltage drops down to about 18 volts, the voltage at node 106 will become 12 volts. As soon as the voltage at node 106 drops below 12 volts, the output o comparator 104 goes low, thereby providing a low signal to the base of transistor 108. Transistor 108 is thus turned off. When transistor 108 is OFF, current flows from the 12 volt source connected to line 110 through resistor 112 and charges up capacitor 114. Once capacitor 114 is sufficiently charged, capacitor 114 will begin to drive current through zener diode 116 into the gate of SCR 118, thereby turning ON SCR 118. When SCR 118 is turned ON, current is drawn away from diode 124, so that all the current through line 122 passes through resistor 120 and SCR 118 instead of through relay 128. Relay 128 is thereby turned OFF, which removes current from the electric motor. SCR 118 will continue to conduct as long as the 24 VDC supply is connected to line 122. The operator of the lawnmower must then release bail handle 40 (FIG. 1) to return SCR 118 to its original OFF state. SCR 118 will remain OFF unless the original low battery voltage condition recurs after restart, at which time 5CR 118 will again be turned ON to remove current from the electric motor.

To insure that the user is able to restart the lawnmower after the lawnmower has been stopped by the low voltage circuit, even if the low battery voltage condition still exists, capacitor 114 is discharged through transistor 130 to prevent SCR 118 from being immediately turned ON again after the restart. As soon as transistor 126 is turned OFF, current will flow through resistor 132 to the base of transistor 130, thereby turning ON resistor 130 and shorting out capacitor 114.

This restart circuit operates each time the motor is stopped for any type of shutdown, whether the shutdown is caused by a low battery voltage or by an overcurrent condition. Capacitor 114 is discharged completely so that upon restart, he condition that caused the shutdown does not prevent the lawnmower from being restarted. Of course, if the condition causing the shutdown still exists after restart, the lawnmower will again shut down after a very short period of time. Even if the shutdown is caused by a low battery voltage, he lawnmower may be restarted at least briefly even though the battery voltage still is below the cutoff level. The lawnmower will continue o operate if the battery voltage has rebounded to an acceptable level above approximately 18 volts.

The battery undervoltage shutdown feature is delayed for a period of approximately 3 seconds by the RC timing circuit consisting of resistor 112 and capacitor 114. Capacitor 114 must charge up to the threshold voltage of zener diode 116 before the motor current will be shut off due to a low battery voltage.

The 35 amp shutdown circuit will now be described. This shutdown circuit includes a feedback resistor 136, which is connected in series to high current line 138. A small RC timing circuit, consisting of resistor 140 and capacitor 142, filters the feedback signal passing through resistor 136. The filtered feedback signal then is applied to the negative input of comparator 144, wherein the signal is compared to a voltage set point determined by resistors 146 and 148. In he present embodiment, the voltage at node 152 is 0.35 volts, which corresponds to 35 amps through the motor. If the voltage at node 152, between resistor 140 and capacitor 142, ever exceeds 0.35 volts, he output of comparator 144 will go low, thereby removing current from the base of transistor 108. Transistor 108 will then turn OFF, thereby allowing capacitor 114 to charge up. The remainder of the circuit operates in the same manner as he undervoltage circuit described above, including the 3 second delay.

The operation of the 50 amp shutdown circuit will now be described. The 50 amp shutdown circuit uses the same filtered feedback signal used in the 35 amp shutdown circuit discussed above. The filtered feedback signal is input to the positive input of comparator 154, and is compared to a voltage determined by resistors 156 and 158. In the present case the voltage node 160 is 0.5 volts (which corresponds to 50 amps through the motor), so that if the voltage at the positive input of comparator 154 is ever greater than 0.5 volts, then the output of comparator 154 will go high. When the output of comparator goes high, current will flow from the 12 VDC source through resistor 162, through resistor 164, and into he gate of SCR 118 to turn ON SCR 118. When SCR 18 is turned ON, current is removed from the base of transistor 126, and relay 128 is turned OFF. The turning OFF of relay 128 removes current from motor 18 (FIG. 3). Since zener diode 116 is not part of this circuit, the motor will turn off immediately without any 3 second delay.

The 50 amp shutdown circuit does contain a 1½ second delay during lawnmower start-up to prevent the lawnmower from being shut off due to the high in-rush current that normally occurs during start-up. This delay circuit operates as follows. The RC time constant voltage determined by resistor 166 and capacitor 168 is applied to he positive input of a comparator 170. A voltage determined by resistors 172 and 174 is applied to the negative input of comparator 170. Once the RC time constant voltage applied to the positive input of comparator 170 rises above the constant voltage determined by resistors 172 and 174, the output of comparator 170 goes high. This occurs approximately 1½ seconds after mower start-up. In essence, comparators 154 and 170 must both have high outputs for a sufficient voltage to be applied to the gate of SCR 118 to shut off the electric motor.

The control circuit also includes a voltage regulator 176 that is used to convert 24 volts to 12 volts. Resistor 178 prevents a current surge from damaging the circuits. Capacitor 180 filters out switching noise. Flyback diode 182 prevents damage to voltage regulator 176 if switching noise appears on the 24 volt line; it ensures that the output side of the regulator can never be a higher voltage than the input side. Capacitor 184 filters out switching noises from the 12 volt line.

Current is provided to motor 18 through a quick connect/disconnect connector 186, through circuit breaker 188, through safety key contacts 62 and 64, and through line 192. After passing through motor 18, the current travels through line 138 and through relay contacts 194, which are the contacts for relay 128. Line 210 is connected to the negative side of the battery through feedback resistor 136.

Power passes through contacts 62 and 64 into line 198. If bail switch 200 on the lawnmower handle is in the STOP position, the motor is shorted since lines 198 and 202 are connected together through switch 200. If the bail switch is in the RUN position, as when the bail handle is being gripped by the operator, power passes from line 198 through line 204 and into line 206. If reed switch 208 is closed, power then passes to line 196 to voltage regulator 176 through diode 178. Reed switch 208 (FIG. 8) senses whether a side discharge chute, a mulching attachment, or a bagging attachment is attached to the lawnmower. The reed switch is closed only when such an attachment is in place. Flyback diode 211 helps protect relay contacts 194 during shutoff by providing an alternate path for motor current flow. Surge resistor 213 protects transistor 126 during shutoff by providing an alternate path for relay current flow.

As depicted in FIG. 8, reed switch 208 is disposed inside the cutting area of lawnmower chassis 16, on an inner side of chassis sidewall 209. A magnet 211 is affixed to attachment 26 and is disposed on the opposite, outer side of sidewall 209. Reed switch is closed in response to magnet 211, even though sidewall 209 is disposed between the magnet and the reed switch.

Figure 20:
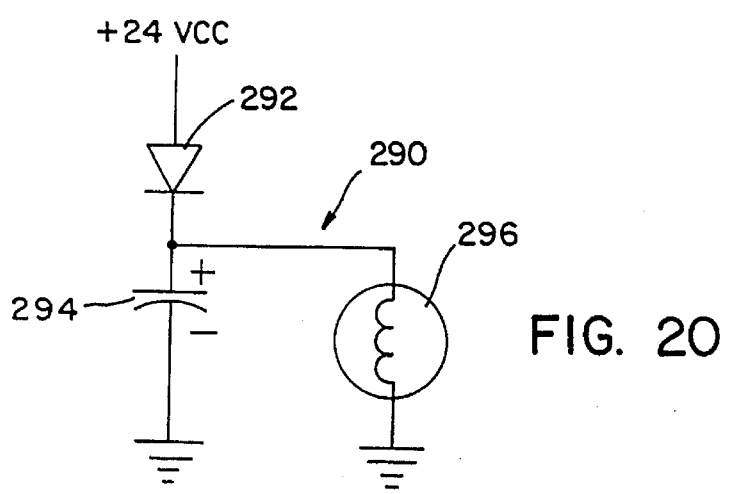
FIG. 20 is a schematic diagram of an alarm circuit that may be used in the present invention.

FIG. 20 depicts an optional alarm circuit that may be used in the present invention, to warn the operator that key 48 is in place when the mower is not being used. In FIG. 20, alarm circuit 290 includes a diode 292, a capacitor 294, and an indicator 296. Indicator 296 is shown as a buzzer, but other audible or visual indicators may be used.

When the lawnmower is turned on and bail switch 200 is in the STOP position, no alarm signal is generated. After bail switch 200 is placed in the RUN position and the lawnmower is running, capacitor 294 is charged, and stays charged until bail switch 200 goes to the STOP position. Thereafter, capacitor 294 discharges through indicator 296, resulting in the generation of an alarm signal.

If the alarm circuit depicted in FIG. 20 is placed after key 48 and is not on the main circuit board, the alarm signal will be generated whenever key 48 is in place.

Another important feature of the present invention is the height adjustment assembly used to adjust the height of the chassis o achieve different cutting lengths. The height adjustment assembly is best understood by reference to FIGS. 2, 8, and 10 through 12. In these figures, the height adjustment assembly includes a lever arm 212 that may be placed in one of the plurality of fixed positions by moving the lever arm into one of slots 214. Slots 214 are best shown in FIG. 11. These slots are formed in a retainer member 216.

Lever arm 212 is connected to a pivot arm 218 which pivots about a pivot 220. Pivot 220 is retained in position by a bracket 222 affixed to the lawnmower chassis. The opposite end of pivot arm 218 is connected to an axle end 224a of axle 224. Axle 224 spans the distance between opposed wheels 28a and 28b, As lever arm 212 is moved, pivot arm 218 pivots about pivot 222, thereby raising or lowering axle 224 to thereby raise or lower chassis portion 226 that engages axle 224. Wheel 28a is connected to axle end 224a.

The movement of axle 224 in response to the movement of pivot arm 218 causes an opposed pivot arm 228 at the opposite end of axle 224 to also be pivoted about its fixed pivot 230. Pivot 230 is retained in position by a bracket 232 that is interconnected with the lawnmower chassis. The opposite end of pivot arm 228 is connected to an end 224b of axle 224. Therefore, axle end 224b is also raised or lowered in response to the movement of lever arm 212, to thereby raise or lower one end of the lawnmower chassis.

Movement of lever arm 212 also results in the raising or lowering of the opposite end of the lawnmower chassis due to a link means that connects pivot arm 228 to a pivot arm 234, which in turn is interconnected with a second wheel axle 236. The link means is best depicted in FIGS. 8 and 12. As shown in FIGS. 8 and 12, the link mechanism includes a link arm 238 that is interconnected between pivot arm 228 and pivot arm 234. The link mechanism also preferably includes a resilient member such as spring 240 (FIG. 12), interconnected between one end of L-shaped pivot arm 228 and link arm 238 at point 242. In the alternative, spring 240 may be connected between pivot arm 234 and link arm 238. The purpose of spring 240 is to reduce the force required to raise or lower the lawnmower chassis.

Figure 10:
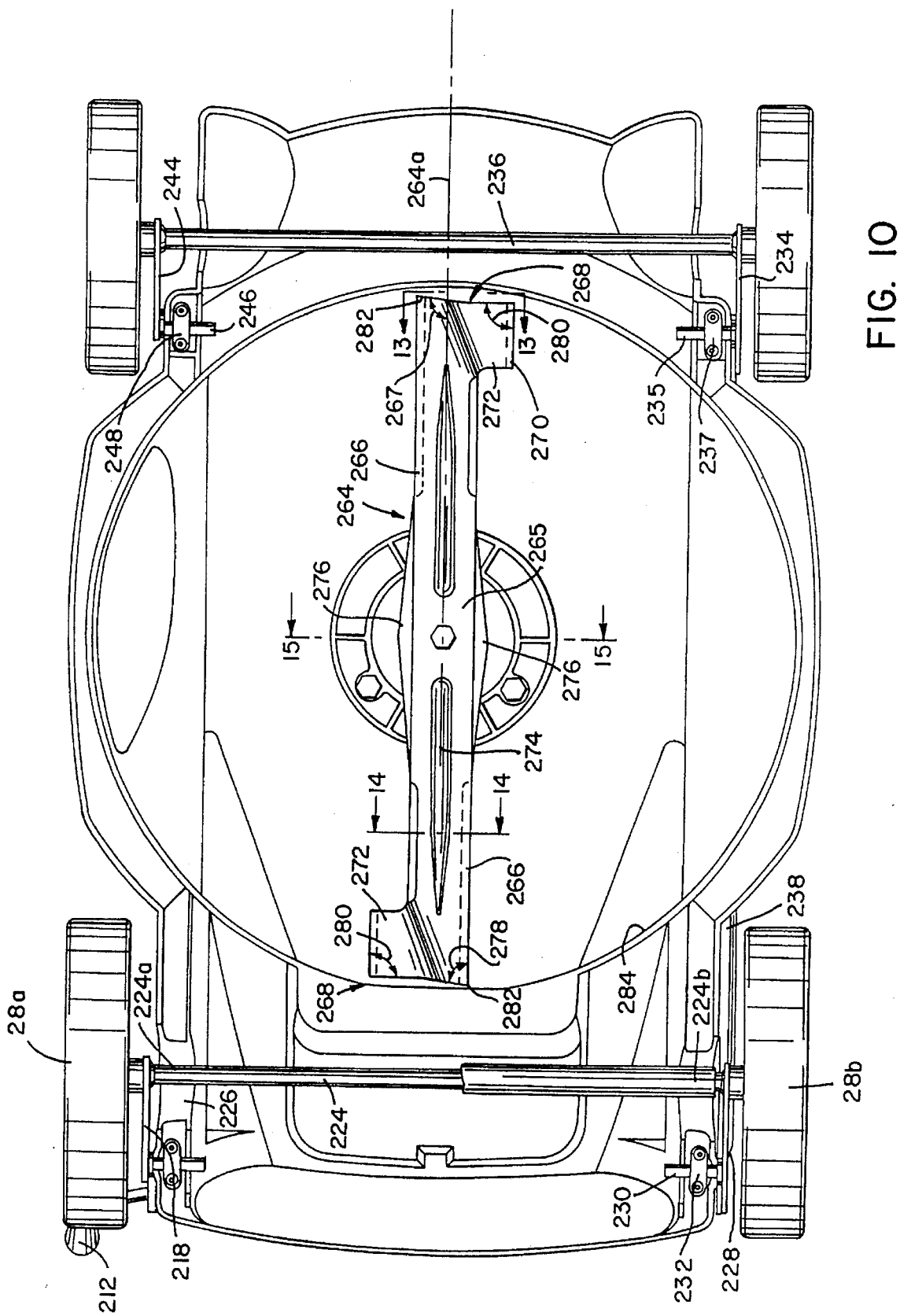
FIG. 10 is a bottom view of a lawnmower according to the present invention.
Figure 11:
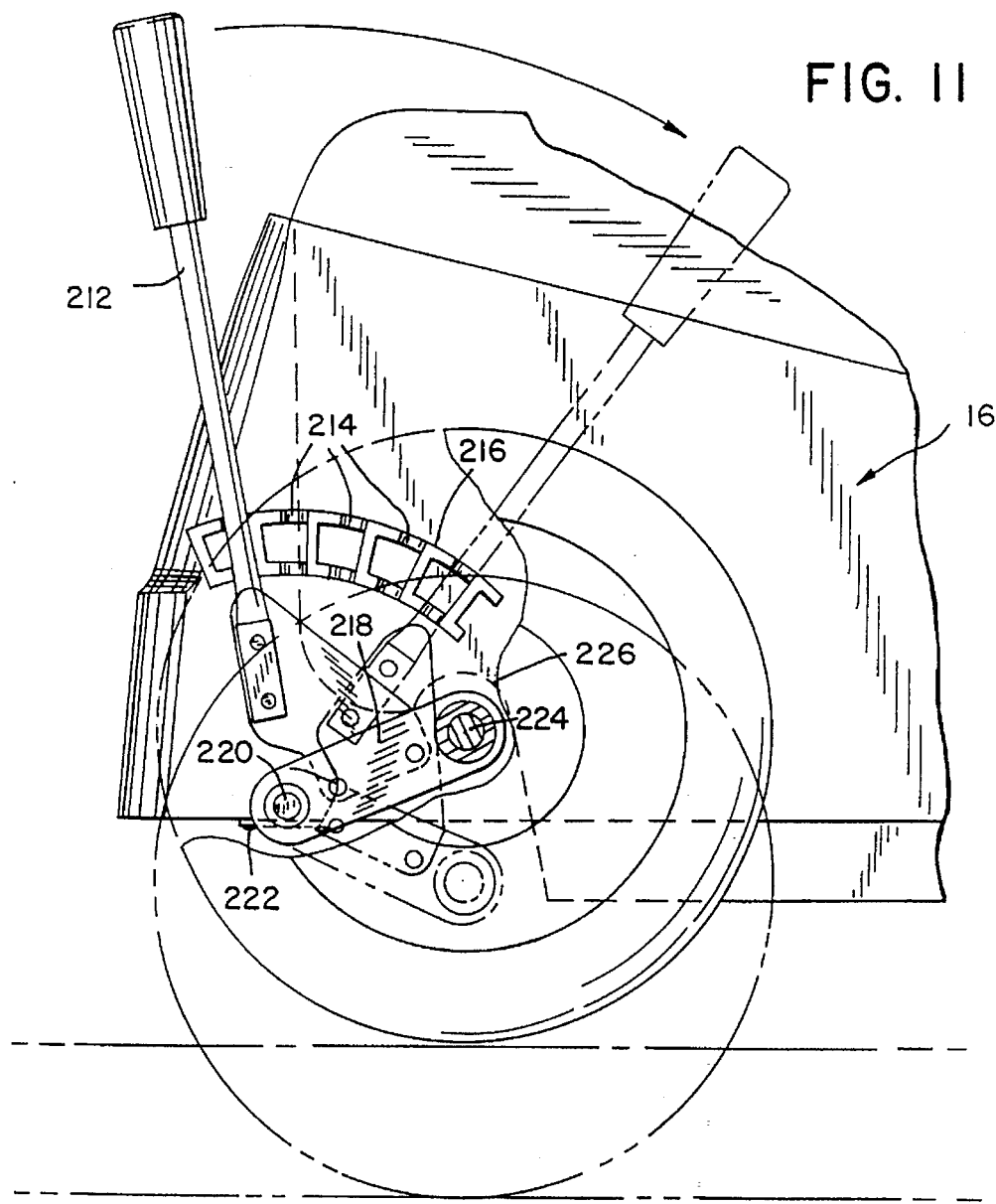
FIG. 11 is a side exploded view depicting the height adjustment lever in two different positions, taken along line 11—11 of FIG. 8.
Figure 13:
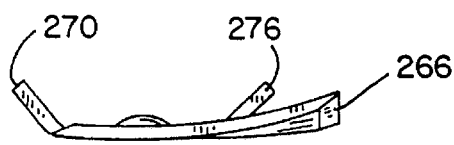
FIG. 13 is an end view of a lawnmower blade according to the present invention, taken along line 13—13 of FIG. 10.
Figure 14:
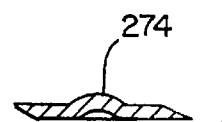
FIG. 14 is a cross-sectional side view of the cutting blade, taken along line 14—14 of FIG. 10.

As shown in FIG. 10, the height adjustment mechanism also includes a fourth pivot arm 244 having a fixed pivot 246. Pivot 246 is retained in position by a bracket 248 that is connected to the lawnmower chassis. The movement of pivot arm 234 in response to the movement of link arm 238 results in the raising or lowering of second wheel axle 236 that is interconnected between pivot arms 234 and 244. Pivot arm 244 also has a fixed pivot 235 that is retained in position by a bracket 237 interconnected with the lawnmower chassis.

In response to the rotation of pivot arm 234 about pivot 235, wheel axle 236 is raised or lowered, thereby raising or lowering that portion of the lawnmower chassis that engages wheel axle 236.

Another important feature of the present invention enables the lawnmower handle assembly to be folded during non-use, while at the same time enabling the handle to be tightened down to the lawnmower chassis without any movement or play between the lawnmower handle and the lawnmower chassis. This feature of the present invention is best understood in connection with FIGS. 16 and 17. As shown in these figures, the handle assembly includes an upper section 252 and a lower section 254. Sections 252 and 254 are interconnected by a pair of threaded thumbscrews 36 which are loosened to hold down the handle for storage.

The handle assembly also includes a pair of threaded thumbscrews 38 which are disposed in respective apertures within lawnmower chassis 16.

As best shown in FIG. 17, each of thumbscrews 38 is received in a channel 256. Each of the thumbscrews 38 is also received in an aperture 39 of handle section 254. Channel 256 preferably has a substantially flat bottom wall 258 and two opposed angled sidewalls 260 and 262. Sidewalls 260 and 262 form included angles of between 90° and 180° with respect to bottom wall 258 of channel 256, with 105° being preferred.

Although FIG. 17 depicts the preferred configuration of channel 256, other channel shapes may be used that achieve the same purpose of channel 256. For example, the channel may be substantially V-shaped, or it may have a concave shape- Indeed, any channel shape that has two opposed non-parallel sidewalls, even without a bottom wall, will achieve the purpose of the channel according to the present invention as long as the lower end of handle section 254 has a corresponding shape. The included angle between the two non-parallel sidewalls is between 0° and 90°.

The lower end of lawnmower handle section 254 has a corresponding shape to that of channel 256. That is, the lower end of handle section 254 has angled side 254a that engages angled sidewall 260; side 254a has an included angle with respect to flat handle wall 254c that is between 90° and 135°, with 105° being preferred. Similarly, section 254b has a shape corresponding to angled sidewall 262, and forms an included angle of between 90° and 135° with respect to flat handle wall 254c, with 105° being preferred.

The advantage of using angled sidewalls 260 and 262, and angled handle sides 254a and 254b, is that the lower end of handle section 254 may be tightened down by tightening thumbscrews 38 without there being any play between handle sides 254a and 254b on the one hand and channel sidewalls 260 and 262 on the other hand.

During storage of the lawnmower, thumbscrews 38 are loosened but not removed. The lower end of handle section 254 may then be displaced out of channel 256, thereby allowing handle section 254 to be repositioned to promote folding of the handle assembly for storage.

The present invention also includes a unique cutting blade that provides sufficient lift for lifting the grass to be cut while at the same time minimizing the likelihood of jamming due to the accumulation of cut grass between a chassis wall and the cutting blade.

The cutting blade according to the present invention is best understood by reference to FIGS. 10 and 13 through 15. In these figures, cutting blade 264 includes lead cutting edges 266, a pair of opposed outer blade edges 268, and a pair of trailing, angled lift edges 270. Lift edges 270 are part of respective lift sections 272 that prevent clippings from escaping between the blade cutting path and the inner sidewall of the lawnmower chassis, and that impart movement to the clippings for the purposes of mulching or ejection. The lift sections also provide a sufficient pressure drop to lift the grass for cutting. Lift sections 272 and lift edges 270 are disposed opposite at least a portion of lead cutting edges 266.

Figure 15:
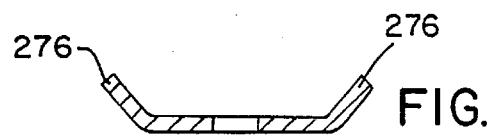
FIG. 15 is a cross-sectional side view of the cutting blade, taken along line 15—15 of FIG. 10.

Blade 264 also includes a pair of raised reinforcing ribs 274 and flared supports 276. Ribs 274 and flared supports 276 both provide strength and stability to the rotating cutting blade while creating minimal wind resistance. As shown in FIGS. 10 and 15, the flared supports are disposed on opposite sides of hub 265, are non-perpendicular and non-coplanar with hub 265, and are substantially V-shaped-Blade 264 is bolted to the output shaft of motor 18 at hub 265.

Outer blade edges 268 are disposed between cutting edges 266 and trailing lift edges 270. Each of outer blade edges 268 preferably has a rake angle 278 between cutting edge 266 and outer blade edge 268 that is less than 90°, and is preferably between 75° to 85°. About halfway between cutting edge 266 and lift edge 270, the rake angle is discontinued and may in fact be reversed. Other rake angles may be used, as long as included angle 267 between outer blade edge 268 and blade longitudinal axis 264a is greater than 90° when taken across the blade, and as long as outer blade edge 268 is non-linear. Included angle 267 is between 120° and 95°, with 105° to 95° being preferred. As depicted in FIG. 10, outer blade edges 268 may be substantially V-shaped; however, other shapes may be used including a concave shape, as long as the outer blade edges are non-linear.

The purpose of rake angle 278 and included angle 267 is to provide the cutting blade with points 282 which may readily move through any grass clippings or debris that has accumulated between the blade end and sidewall 284 of the lawnmower chassis. In some prior art lawnmowers, the outer blade edge was substantially straight, and perpendicular to the longitudinal axis of the blade, which may result in jamming of the cutting blade when the cutting blade encountered accumulated debris between the blade ends and sidewall 284.

The reason for not continuing the rake angle all the way to trailing lift edge 270 is that a substantial portion of the lift surface would be removed from the end of the blade, where it is needed the most, for lifting and moving grass and for preventing clippings from escaping between the cutting path and the chassis sidewall. By discontinuing or reversing the rake angle, a substantial portion of the effective lift surface is retained.

In the present invention, cutting points 282 are provided to move through any accumulated debris without sacrificing a significant portion of the lift sections. The rake angle and the lift angle enable the cutting blade to move through any accumulated debris without jamming while at the same time creating sufficient lift for proper grass cutting and mulching or ejection.

The present invention also includes a unique wire harness which enables two batteries to be simultaneously charged, while at the same time preventing a charged battery from discharging into an uncharged battery.

Figure 19:
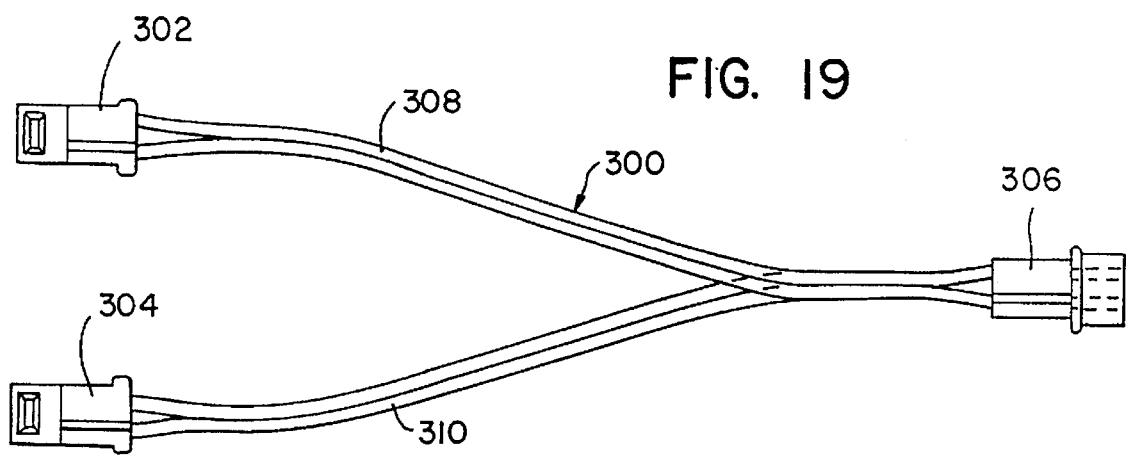
FIG. 19 depicts a wire harness that may be used to simultaneously charge two batteries.

This wire harness is depicted in FIG. 19. In FIG. 19, wire harness 300 includes two-prong connectors 302, 304 and 306, a pair of conductive wires 308 connected between connector 302 and connector 306, and a pair of conductive wires connected between connectors 304 and 306. Connector 302 is connected to a first electrical connector on a first battery, connector 304 is connected to a second electrical connector on a second battery, and connector 306 is connected to an electrical connector on a battery recharger. Each of the first and second batteries preferably has a blocking diode to prevent current from leaving their respective electrical connectors. The blocking diodes are preferably disposed between their respective electrical connectors and a respective battery terminal. This feature prevents current from one of the batteries from passing through wire harness 300 into the other battery, in the event that one of the batteries is more fully charged than the other. This feature also prevents a spark or fire if the two pans of the same battery electrical connector are accidentally shorted together.

While the preferred embodiment of the present invention has been shown and described, alternate embodiments will be apparent to those skilled in the art and are within the intended scope of the present invention. Therefore, the invention is to be limited only by the following claims.

We claim:

1. A height adjustment apparatus that adjusts the height of a lawnmower chassis, comprising:

a first wheel axle having first and second ends;

a first pivot arm, interconnected with said first end of said first axle, and having a first pivot interconnected with said chassis;

a second pivot arm, interconnected with said second end of said first axle, having a second pivot interconnected with said chassis, said first axle and said chassis being the only members that directly connect said first and second pivot arms to each other;

a second wheel axle having first and second ends;

a third pivot arm, interconnected with said first end of said second axle, having a third pivot interconnected with said chassis;

a fourth pivot arm, interconnected with said second end of said second axle, having a fourth pivot interconnected with said chassis, said second axle and said chassis being the only members that directly connect said third and fourth pivot arms to each other;

means for pivoting said first pivot arm about its first pivot; and link means for pivoting said third pivot arm about its third pivot in response to the pivoting of said first pivot arm;

whereby the pivoting of said first pivot arm by said pivoting means rotates said first wheel axle to thereby pivot said second pivot arm about said second pivot;

whereby the pivoting of said first pivot arm by said pivoting means causes said link means to pivot said third pivot arm about its third pivot; and whereby the pivoting of said third pivot arm by said link means rotates said second wheel axle to pivot said fourth pivot arm about said fourth pivot, thereby adjusting the height of said lawnmower chassis.

2. The height adjustment apparatus of claim 1, further comprising:

a spring affixed between said link means and either said first or second pivot arms.

3. The height adjustment apparatus of claim 1, wherein said pivoting means includes:

an adjustment lever interconnected with said first pivot arm; and means for retaining said adjustment lever in one of a plurality of fixed positions.

4. The height adjustment apparatus of claim 3, wherein said retaining means comprises:

a plurality of slots, said adjustment lever being positioned in one of said slots.

5. A control system for a battery-powered lawnmower comprising:

a lawnmower handle having a first end interconnected with a chassis of said lawnmower, and having an opposed second handle end disposed away from said chassis;

a deadman control interconnected with said second end of said handle, said deadman control including a movable member that is held by an operator during operation of said lawnmower, and that is released by said operator to stop said lawnmower;

means for stopping said lawnmower upon the occurrence of at least one predetermined condition; and means for restarting said lawnmower after said lawnmower has been stopped by said stopping means, by releasing said movable member and by thereafter moving said movable member.

6. The control system of claim 5, wherein said movable member is an elongated handle.

7. The control system of claim 5, wherein said movable member is a push button of a push button switch.

8. The control system of claim 5, wherein said at least one predetermined condition includes a low battery voltage.

9. The control system of claim 5, wherein said predetermined condition includes an overcurrent condition that lasts more than a preset time period.

10. A safety device for a battery-powered lawnmower, said lawnmower having a chassis, said safety device comprising:

a removable battery, including
a surface disposed near an upper end of said battery;

at least one electrical connector interconnected with said chassis;

a removable key, including
at least one electrically conductive member that engages said electrical connector to allow said lawnmower to operate; and an engagement member that causes said battery and said key to engage each other, whereby the removal of said battery also disengages said electrically conductive member from said electrical connector.

11. The safety device of claim 10, further comprising a handle affixed to said key.

12. The safety device of claim 10, wherein
said battery includes a recharger connector that receives a connector from a battery recharger; and wherein
said removable key includes a means for blocking said recharger connector when said electrically conductive member is connected to said battery electrical connector.

13. The safety device of claim 12, wherein said blocking means includes a substantially flat surface on said key.

14. The safety device of claim 10, wherein said engagement member is a flange.

15. The safety device of claim 10, wherein said engagement member prevents said battery from being replaced after said battery has been removed and if said key has been replaced.

16. A safety device for a battery-powered lawnmower, said lawnmower having a chassis, said safety device comprising:

a removable battery;

at least one electrical connector interconnected with said chassis;

a removable key, including
at least one electrically conductive member that engages said electrical connector to allow said lawnmower to operate; and an alarm circuit that provides an alarm when the electrically conductive member of said key engages said electrical connector.

17. A handle attachment assembly for a lawnmower, comprising:

two channels disposed on opposite sides of a mower housing of said lawnmower, each of said channels including:
a first sidewall;
a second sidewall that is non-parallel to said first sidewall;

a lawnmower handle member having two ends, each end being received in one of said channels, wherein the shape of an outer surface of the handle member end corresponds to the shape of the channel into which the handle member is received; and means for attaching each of said handle members to said housing.

18. The handle attachment assembly of claim 17, wherein said attachment means includes:

a first aperture in each of said channels;

a second aperture in each of said handle member ends; and a threaded bolt that is received in both of said first and second apertures.

19. The handle attachment assembly of claim 17, wherein each of said channels further comprises:

a bottom wall having first and second opposed ends, said first sidewall being adjacent to said bottom wall first end, and said second sidewall being adjacent to said bottom wall second end.

20. The handle assembly of claim 19, wherein said first sidewall and said bottom wall first end form an included angle that is greater than 90° and less than 180°.

21. A cutting blade for a lawnmower, said cutting blade having a longitudinal axis, comprising:

a lead cutting edge disposed near one end of said blade;

a trailing lift edge disposed opposite to at least a portion of said cutting edge; and an outer blade edge at the end of said blade between said cutting edge and said lift edge;

wherein a portion of the outer blade edge between the cutting edge and the blade longitudinal axis forms an included angle with said longitudinal axis taken across said blade that is greater than 90°, and wherein said outer blade edge is non-linear.

22. The cutting blade of claim 21, wherein said outer blade edge is substantially V-shaped.

23. Apparatus for mounting a removable battery to a lawnmower, comprising:

a removable battery having at least one projection extending from a side surface of said battery;

at least one groove formed in said lawnmower and having a longitudinal axis that receives said projection, said groove including
a first tapered section having a first set of sidewalls, at least one of said sidewalls forming a non-parallel first angle with said longitudinal axis; and
a second tapered section adjacent to said first tapered section having a second set of sidewalls, at least one of said second sidewalls forming a non-parallel second angle with said longitudinal axis.

24. The apparatus of claim 23, wherein
said first angle is between 0° to 5°; and
said second angle is between 1° to 45°.

25. The apparatus of claim 23, further comprising:
a third tapered section adjacent to said second tapered section having a third set of sidewalls, at least one of said third sidewalls forming a non-parallel third angle with said longitudinal axis.

26. The apparatus of claim 25, where said third angle is between 0° and 5°.

27. The apparatus of claim 23, further comprising:
a first electrical connector affixed to said battery; and
a second electrical connector affixed to said lawnmower that engages said first electrical connector.

28. A safety interlock for a lawnmower, said lawnmower having a chassis that includes a sidewall, comprising:
a magnetically-responsive switch disposed on said chassis on a first side of said sidewall; and
a removable attachment, including
means for connecting said attachment to said chassis; and
a magnet disposed on said attachment and on an opposite second side of said chassis sidewall;
whereby said magnetically-responsive switch is engaged in response to said magnet when said attachment is connected to said chassis.

29. The safety interlock of claim 28, wherein switch is a reed switch.

30. The safety interlock of claim 28, wherein said removable attachment is a side discharge chute.

31. The safety interlock of claim 28, wherein said removable attachment is a mulching cover.

32. The safety interlock of claim 28, wherein said removable attachment is a bagging attachment.

33. A battery-powered lawnmower having a chassis, comprising:
a height adjustment apparatus that adjusts the height of said lawnmower chassis, including:
a first wheel axle having first and second ends;
a first pivot arm, interconnected with said first end of said first axle, and having a first pivot interconnected with said chassis;
a second pivot arm, interconnected with said second end of said first axle, having a second pivot interconnected with said chassis;
a second wheel axle having first and second ends;
a third pivot arm, interconnected with said first end of said second axle, having a third pivot interconnected with said chassis;
a fourth pivot arm, interconnected with said second end of said second axle, having a fourth pivot interconnected with said chassis;
means for pivoting said first pivot arm about its first pivot;
link means for pivoting said third pivot arm about its third pivot in response to the pivoting of said first pivot arm;
whereby the pivoting of said first pivot arm by said pivoting means rotates said first wheel axle to thereby pivot said second pivot arm about said second pivot;
whereby the pivoting of said first pivot arm by said pivoting means causes said link means to pivot said third pivot arm about its third pivot;
whereby the pivoting of said third pivot arm by said link means rotates said second wheel axle to pivot said fourth pivot arm about said fourth pivot, thereby adjusting the height of said lawnmower chassis;
a control system, including:
a lawnmower handle having a first end interconnected with said lawnmower chassis, and having an opposed second handle end disposed away from said chassis;
a deadman control interconnected with said second end of said handle, said deadman control including a movable member that is held by an operator during operation of said lawnmower, and that is released by said operator to stop said lawnmower;
means for stopping said lawnmower upon the occurrence of at least one predetermined condition;
means for restarting said lawnmower after said lawnmower has been stopped by said stopping means, by releasing said movable member and by thereafter moving said movable member;
a safety device, including:
a removable battery;
at least one electrical connector interconnected with said chassis;
a removable key, including
at least one electrically conductive member that engages said electrical connector to allow said lawnmower to operate;
an engagement member that causes said battery and said key to engage each other, whereby the removal of said battery also disengages said electrically conductive member from said electrical conductor;
a handle attachment assembly, including:
at least one channel affixed to said lawnmower chassis, including:
a first sidewall;
a second sidewall that is non-parallel to said first sidewall;
said first end of said lawnmower handle being received in said channel, wherein the shape of an outer surface of said handle first end corresponds to the shape of said channel; and
means for attaching said handle first end to said chassis;
a cutting blade having a longitudinal axis, comprising:
a lead cutting edge disposed near an end of said blade;
a trailing lift edge disposed opposite to at least a portion of said cutting edge;
an outer blade edge at the end of said blade between said cutting edge and said lift edge;
wherein a portion of the outer blade edge between the cutting edge and the blade longitudinal axis forms an included angle with said longitudinal axis taken across said blade that is greater than 90°, and wherein said outer blade edge is non-linear;
apparatus for mounting said removable battery, comprising:
at least one projection extending from a side surface of said battery;
at least one groove formed in said lawnmower chassis and having a longitudinal axis that receives said projection, said groove including
a first tapered section having a first set of sidewalls, at least one of said sidewalls forming a first angle with said longitudinal axis; and
a second tapered section adjacent to said first tapered section having a second set of sidewalls, at least one of said second sidewalls forming a second angle with said longitudinal axis.

34. A control system for a battery-powered lawnmower, comprising:
a lawnmower handle having a first end interconnected with a chassis of said lawnmower, and having an opposed second handle end disposed away from said chassis;
a deadman control interconnected with said second end of said handle, said deadman control including a movable member that is held by an operator during operation of said lawnmower, and that is released by said operator to stop said lawnmower;

means for stopping said lawnmower upon the occurrence of at least one predetermined condition;

means for momentarily disabling said stopping means for a preset time after the occurrence of said predetermined condition; and means for restarting said lawnmower after said lawnmower has been stopped by said stopping means, by releasing said movable member and by thereafter moving said movable member.

35. A control system for a battery-powered lawnmower, comprising:

a lawnmower handle having a first end interconnected with a chassis of said lawnmower, and having an opposed second handle end disposed away from said chassis;

a deadman control interconnected with said second end of said handle, said deadman control including a movable member that is held by an operator during operation of said lawnmower, and that is released by said operator to stop said lawnmower;

means for stopping said lawnmower upon the occurrence of at least one predetermined condition, said at least one predetermined condition including a first overcurrent condition wherein the current in said lawnmower exceeds a first level;

a second overcurrent condition wherein the current in said lawnmower exceeds a second level that is greater than said first level; and means for restarting said lawnmower after said lawnmower has been stopped by said stopping means, by releasing said movable member and by thereafter moving said movable member.

36. The control system of claim 35, further comprising:

means for delaying the stopping of said lawnmower by said stopping means when said second overcurrent condition is sensed during the staring of said lawnmower.

37. The control system of claim 35, wherein said first level is between 32 to 38 amps; and said second level is between 50 to 60 amps.

38. A safety device for a battery-powered lawnmower, said lawnmower having a chassis and a motor, said safety device comprising:

a removable battery;

an electrical circuit that provides power from said battery to said motor; and a removable key that permits power to be supplied from said battery to said motor, said key also engaging said battery such that removal of said battery also causes the removal of said key and said battery cannot be removed without removing said key, and such that said key may be removed without removing said battery.

* * * * *